(12) United States Patent
Sugiyama (10) Patent No.: US 9,944,033 B2
(45) Date of Patent: Apr. 17, 2018

(54) RIGID CORE FOR FORMING TIRE AND TIRE MANUFACTURING METHOD USING THE SAME

(71) Applicant: SUMITOMO RUBBER INDUSTRIES, LTD., Kobe-shi, Hyogo (JP)

(72) Inventor: Naoki Sugiyama, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/028,102

(22) PCT Filed: Sep. 16, 2014

(86) PCT No.: PCT/JP2014/074439
§ 371 (c)(1),
(2) Date: Apr. 8, 2016

(87) PCT Pub. No.: WO2015/053050
PCT Pub. Date: Apr. 16, 2015

(65) Prior Publication Data
US 2016/0250814 A1 Sep. 1, 2016

(30) Foreign Application Priority Data
Oct. 10, 2013 (JP) ................................. 2013-213137

(51) Int. Cl.
*B29D 30/06* (2006.01)
*B29D 30/12* (2006.01)
*B29C 33/00* (2006.01)

(52) U.S. Cl.
CPC ...... *B29D 30/0661* (2013.01); *B29C 33/0055* (2013.01); *B29D 30/0662* (2013.01); *B29D 30/12* (2013.01); *B29D 2030/0663* (2013.01)

(58) Field of Classification Search
CPC ................ B29D 30/0661; B29D 30/12; B29C 33/0055; B29C 33/76
(Continued)

(56) References Cited

U.S. PATENT DOCUMENTS 4,341,251 A * 7/1982 Beneze .................. B29D 30/06
152/452
6,468,062 B1 * 10/2002 Soulalioux ............. B29D 30/12
425/50
(Continued)

FOREIGN PATENT DOCUMENTS

JP   2006-224377 A   8/2006
JP   2011-161896 A   8/2011
(Continued)

OTHER PUBLICATIONS

International Search Report, issued in PCT/JP2014/074439, dated Dec. 16, 2014.
(Continued)

*Primary Examiner* — James P Mackey
(74) *Attorney, Agent, or Firm* — Birch, Stewart, Kolasch & Birch, LLP (57) ABSTRACT

To prevent rubber from becoming membrane-like mold flash between mating faces and being adhered. It is a rigid core for forming a tire which comprises an annular core main body provided in an outer surface thereof with a tire molding surface for forming a raw tire. The core main body is composed of a plurality of core segments which are divided in a circumferential direction, and each of the core segments has both circumferential end surfaces as mating faces, and the mating faces adjacent to each other in the circumferential direction are butted to each other so as to form the core main body. Each of the mating faces is provided with a border recess extending along an outer peripheral edge of the
(Continued)

mating face and formed by cutting away a corner between the tire molding surface and the mating face.

4 Claims, 7 Drawing Sheets

(58) Field of Classification Search
USPC .................................................. 425/54, 55
See application file for complete search history.

(56) References Cited

U.S. PATENT DOCUMENTS 6,479,008 B1 * 11/2002 Caretta .............. B29D 30/0602
264/326
2015/0030711 A1 1/2015 Kohara

FOREIGN PATENT DOCUMENTS

| JP | 2011-167979 A | 9/2011 |
| JP | 2013-146905 A | 8/2013 |
| JP | 2013-184368 A | 9/2013 |
| WO | WO 2013/001964 A1 | 1/2013 |

OTHER PUBLICATIONS

Written Opinion of the International Searching Authority, issued in PCT/JP2014/074439 (PCT/ISA/237), dated Dec. 16, 2014.
Extended European Search Report, dated Apr. 12, 2017, for counterpart European Application No. 14852011.7.

* cited by examiner

--PRIOR ART--

(B)

--PRIOR ART--

(C)

--PRIOR ART--

RIGID CORE FOR FORMING TIRE AND TIRE MANUFACTURING METHOD USING THE SAME

TECHNICAL FIELD

The present invention relates to a rigid core for forming a tire capable of preventing the occurrence of membrane-like mold flash caused by rubber bitten between core segments, and a tire manufacturing method using the same.

BACKGROUND ART

Recently, in order to improve the accuracy of forming a tire, a method for forming a tire by the use of a rigid core (hereinafter sometimes referred to as core method) has been proposed (see Patent Documents 1 and 2, for example). The rigid core has a core main body having a outer shape according with a shape of the inner surface of a vulcanized tire. A raw tire is formed by sequentially applying tire components onto the core main body. And the raw tire is, together with the rigid core, put into a vulcanizing mold to be sandwiched between the core main body as the inner die and the vulcanizing mold as the outer die, and the raw tire is vulcanization molded.

Figure 8:
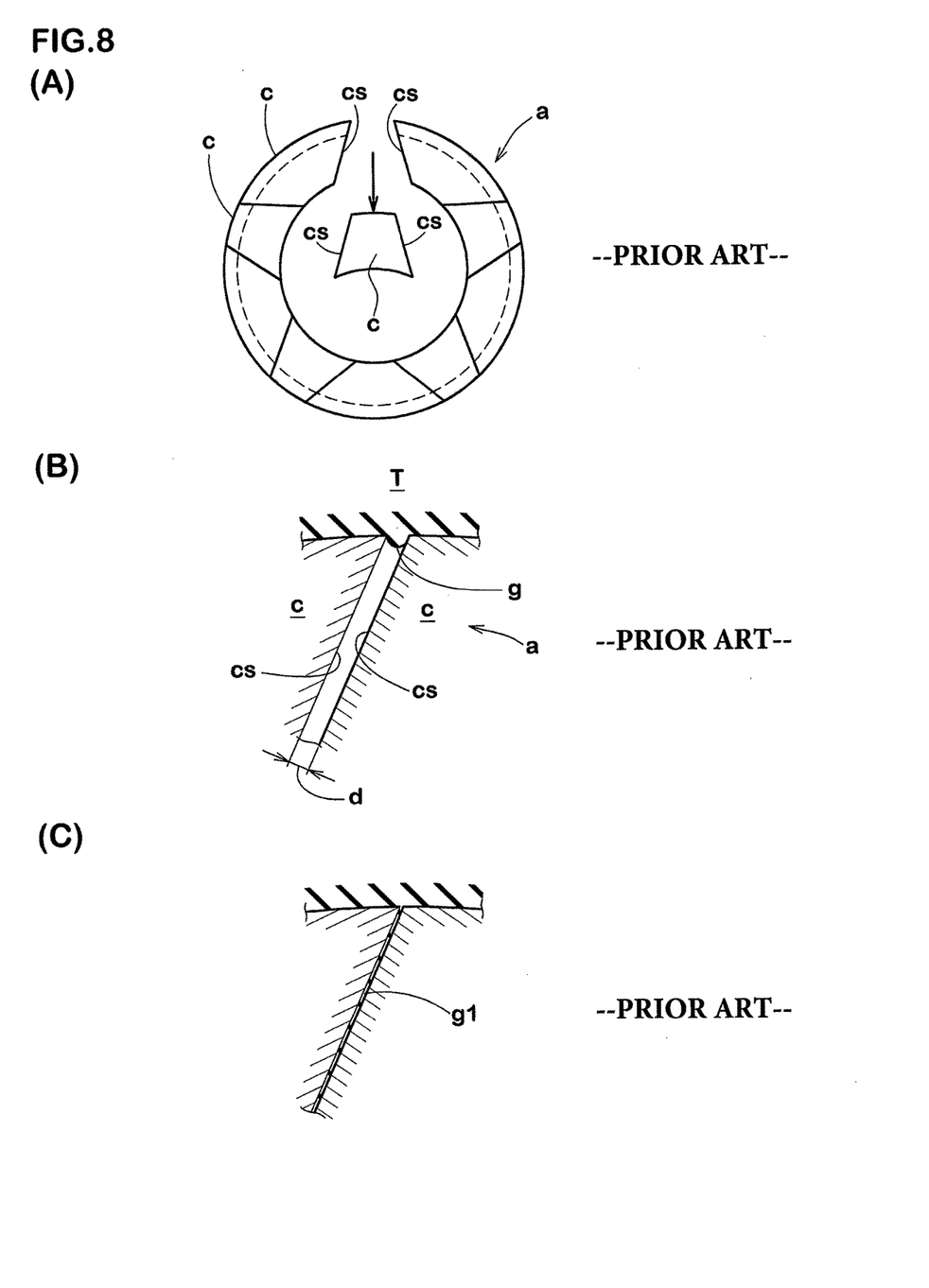

As shown in FIG. 8 (A), the core main body (a) is composed of a plurality of core segments (c) which are divided in the circumferential direction. Thus, after the tire is vulcanized, the core main body (a) is disassembled and removed. Each of the core segments (c) has mating faces (cs) in both end surfaces in the circumferential direction. The mating faces (cs) of each core segment (c) are butted to circumferentially adjacent mating faces, and thereby the core main body (a) is formed in an annular shape.

Here, the temperature of the core main body (a) is changed from normal temperature (about 15 to 50 degrees C.) during forming the raw tire to high temperature (100 degrees C. or more) during vulcanization. Accordingly, as enlargedly shown in FIG. 8 (B), the core main body (a) at the normal temperature is provided between the mating faces (cs, cs) with a gap (d) of about 0.2 mm, for example. As a result, in the thermal expansion state during vulcanization, the mating faces (cs) substantially contact with each other.

In the core method, the vulcanizing mold is closed and the internal pressure is added before the core main body (a) expands thermally. Therefore, an phenomenon that part of the rubber (g) of the raw tire T penetrates into the gap (d), so-called rubber bite phenomenon, occurs. As shown enlargedly in FIG. 8 (C), by the decrease in the gap (d) due to the thermal expansion, the rubber (g) penetrating into the gap (d) is extend as a thin membrane-like mold flash g1 and adhered to the mating faces (cs). As a result, at each time the tire is vulcanization molded, it is necessary to remove the membrane-like mold flash g1 from the mating faces (cs) of the disassembled core segments (c). Therefore, there is a problem such that the production efficiency of the tire is reduced.

PRIOR ART DOCUMENTS

Patent Documents

Patent Document 1: JP 2011-161896
Patent Document 2: JP 2011-167979

SUMMARY OF THE INVENTION

Problems to be Solves by the Invention

The present invention is intended to provide a rigid core for forming a tire and a tire manufacturing method using the same, in which essentially by providing in each mating face with a border recess extending along the outer peripheral edge, the bitten rubber can be prevented from adhering to the mating face as a membrane-like mold flash, and the tire manufacturing efficiency can be improved.

Means for Solving the Problems

The first invention in this application is a rigid core for forming a tire which is a rigid core for vulcanization molding a raw tire which comprises an annular core main body provided in an outer surface thereof with a tire molding surface for forming a raw tire and which is put into a vulcanizing mold together with the raw tire so as to mold the raw tire between the vulcanizing mold and the core main body, the core main body comprises a plurality of core segments which are divided in a circumferential direction, each of the core segments has both circumferential end surfaces as mating faces, and the mating faces adjacent to each other in the circumferential direction are butted to each other so as to form the core main body, and characterized in that each of the mating faces is provided with a border recess extending along an outer peripheral edge of the mating face and formed by cutting away a corner between the tire molding surface and the mating face.

In the rigid core for forming a tire according to the present invention, it is preferable that the border recess has a wall surface parallel with the tire molding surface and a bottom surface parallel with the mating face.

In the rigid core for forming a tire according to the present invention, it is preferable that the border recess has a border width w of 0.5 to 3.0 mm from the outer peripheral edge, and a depth D of 0.1 to 0.5 mm from the mating face.

The second invention in this application includes a vulcanizing step for vulcanization molding the raw tire using the rigid core, and the vulcanizing step is characterized in that a rib-like portion protruding from the inner surface of the tire is formed by rubber of the raw tire flowing into the border recess.

Effect of the Invention

In the present inventions, as described above, the mating faces of the core segments are provided with the border recesses extending along the outer peripheral edges of the mating faces by cutting away the corners between the tire molding surfaces and the mating faces.

Meanwhile, when the mold is closed and in the initial stage of the vulcanization molding, a phenomenon that rubber is bitten between the adjacent core segments occurs. However, the bitten rubber is located in the border recess, and does not penetrate into the gap between the mating faces. Therefore, if the gap between the mating faces are closed thereafter by the thermal expansion of the core main body, the bitten rubber stays in the border recess and is vulcanized as rib-like protruding portions integrated with the inner surface of the tire. Thus, the bitten rubber can be prevented from being stretched into a thin film and adhering to the mating faces, therefore, the operation to remove it is not required, and it is possible to improve the production efficiency of tires.

BRIEF DESCRIPTION OF THE DRAWINGS

FIG. 4 (A) is a side view of the core segment showing the border recesses of the mating faces. (B) is a front view of the core segment in which the mating face is viewed from the front.

FIG. 6 (A), (B) are partial sectional views for explaining the effect of the border recesses.

FIG. 7 (A), (B) are a front view and a side view showing an example of the core segment.

FIG. 8 (A) is a side view of a core main body, (B), (C) are partial cross-sectional views of mating faces for explaining the problems thereof.

MODE FOR CARRYING OUT THE INVENTION

Hereinafter, an embodiment of the present invention will be described in detail. A tire manufacturing method according to the present invention using a rigid core 1 comprises a raw tire forming step (not shown) and a vulcanization step (shown in FIG. 1).

Figure 1:
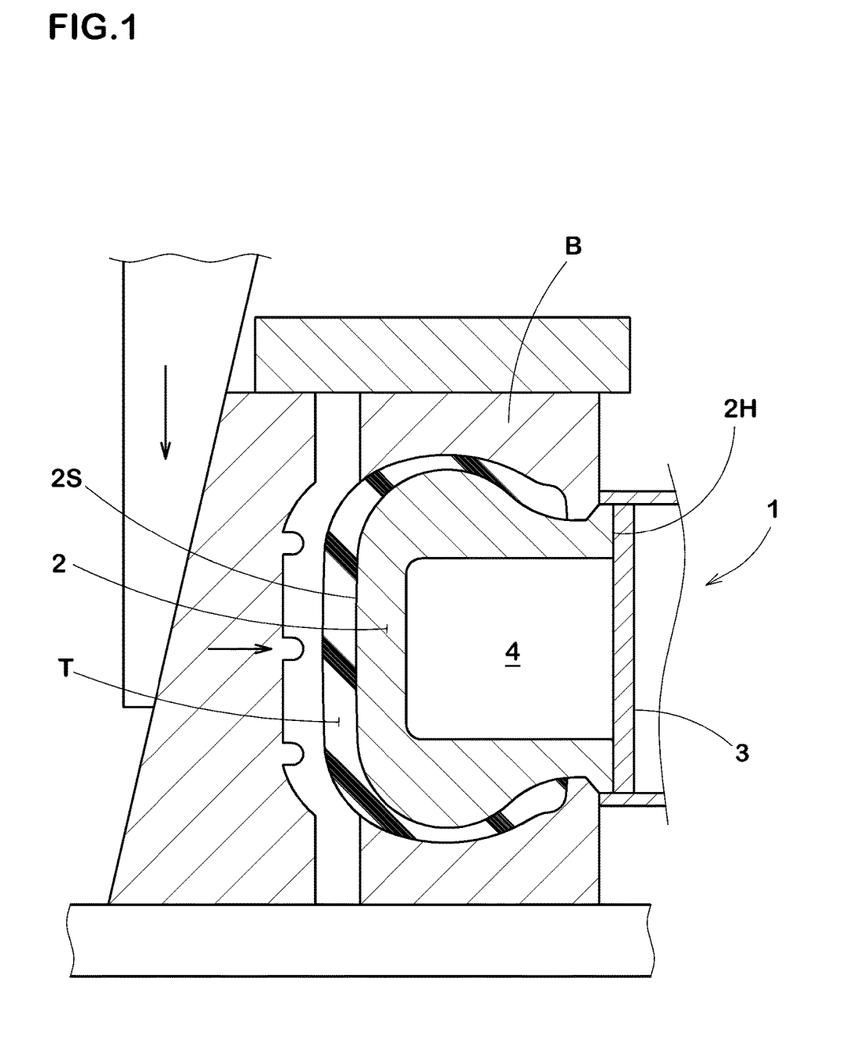
FIG. 1 a cross-sectional view showing a vulcanization step using a rigid core according to the invention.

As shown in FIG. 1, the rigid core 1 comprises an annular core main body 2 provided in the outer surface with a tire molding surface 2s. The tire molding surface 2s is formed in a substantially same shape as the inner surface of the finished tire after vulcanization. In the raw tire forming step, well known tire components, a carcass ply, a belt ply, a sidewall rubber, a tread rubber and the like are applied onto the tire molding surface 2s in succession. Thus, the raw tire T having a substantially same shape as the finished tire, is formed on the tire molding surface 2s.

In the vulcanization step, the raw tire T is put into a vulcanizing mold B together with the core main body 2. Thereby, the raw tire T is vulcanized between the core main body 2 as an inner die and the vulcanizing mold B as an outer die.

The rigid core 1 is composed of the annular core main body 2 and a cylindrical core 3 inserted into the center hole 2H thereof. Except for the core main body 2, conventional well-known structures may be employed in the rigid core according to the present invention. In this specification, therefore, only the core main body 2 is described hereinafter.

The core main body 2 in this example is hollow and having a cavity 4 therein which extends continuously in the circumferential direction. In the cavity 4 of the core main body 2, heating means (not shown) for heating the inside of the raw tire T such as electric heater is disposed.

Figure 2:
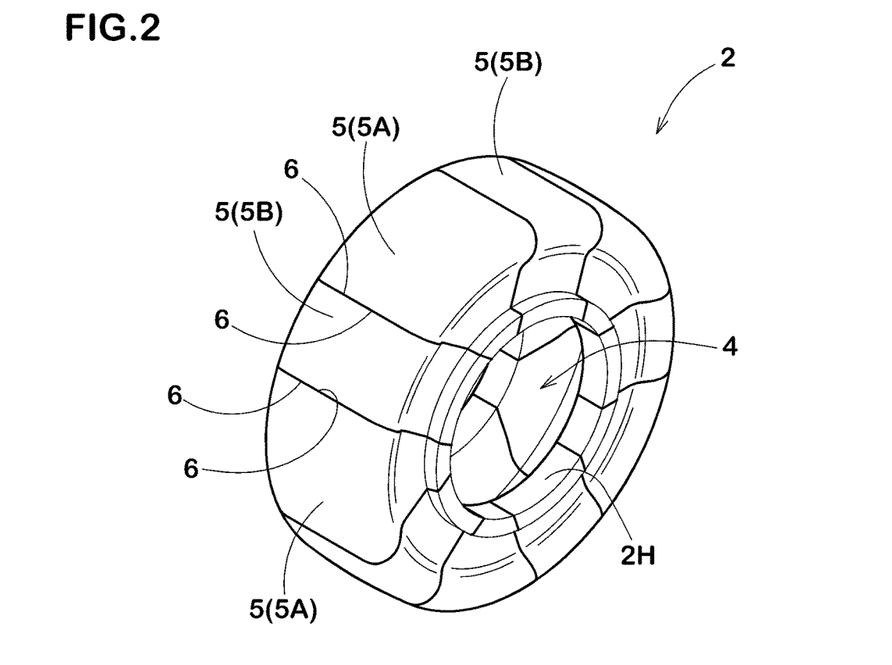
FIG. 2 a perspective view of a core main body.
Figure 3:
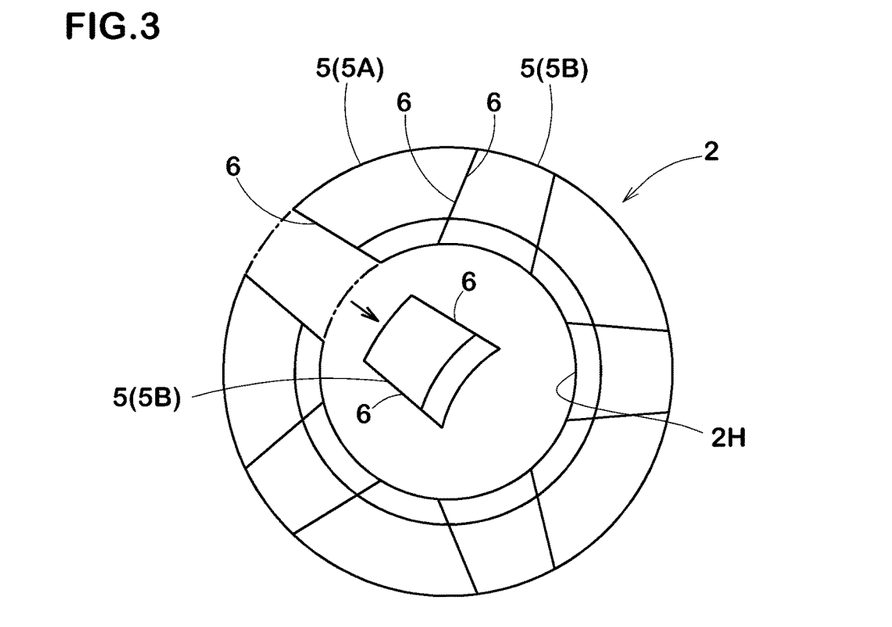
FIG. 3 a side view for explaining a method for disassembling the core main body.

As shown in FIGS. 2, 3, the core main body 2 is formed from a plurality of core segments 5 which are divided in the circumferential direction. Each of the core segments 5 has mating faces 6 in both end surfaces in the circumferential direction. By butting the mating faces 6, 6 of the respective core segments 5 with each other in the circumferential direction, the core main body 2 is formed in an annular shape.

In this example, the core segments 5 are constituted by first, second core segments 5A, 5B arranged alternately in the circumferential direction. In the first core segment 5A, the mating faces 6 on both sides in the circumferential direction are inclined to such direction that the circumferential width decreases toward the radially inside. On the other hand, in the second core segment 5B, the mating faces 6 on both sides are in the circumferential direction are inclined to such direction that the circumferential width increases toward the radially inside. Thereby, the core main body 2 is disassembled by firstly moving the second core segments 5B radially inward. After vulcanization molding, each core segment 5A, 5B is sequentially removed from the bead hole of the finished tire. The core 3 prevents the core segments 5 from moving radially inwardly and connects the core segments 5 integrally.

Figure 4:
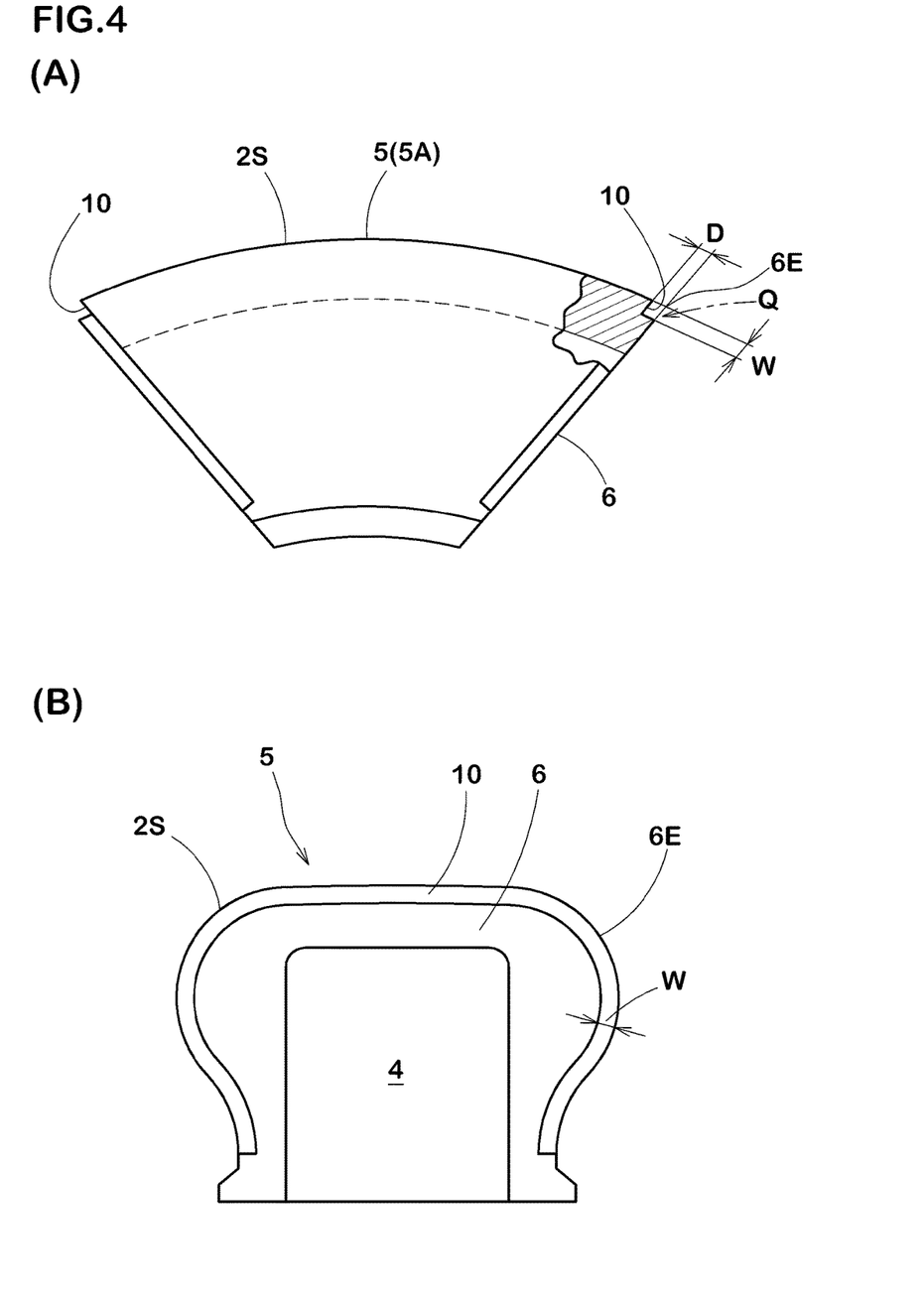

In FIGS. 4 (A), (B), the first core segment 5A is shown as a representative. As shown in FIGS. 4 (A), (B), in each of the mating faces 6, a border recess 10 extending along an outer peripheral edge 6E of the mating face 6, is formed by cutting away a corner portion Q between the mating face 6 and the tire molding surface 2S. The above-mentioned outer peripheral edge 6E means a ridge line at which the mating faces 6 and the tire molding surface 2S virtually intersect. It is not necessary to form the border recess 10 over the entire periphery of the mating face 6 as long as it is formed in a range where the tire molding surface 2S is formed. It is desirable that the border recesses 10 are also provided on the second core segments 5B, not only the first core segments 5A.

Figure 5:
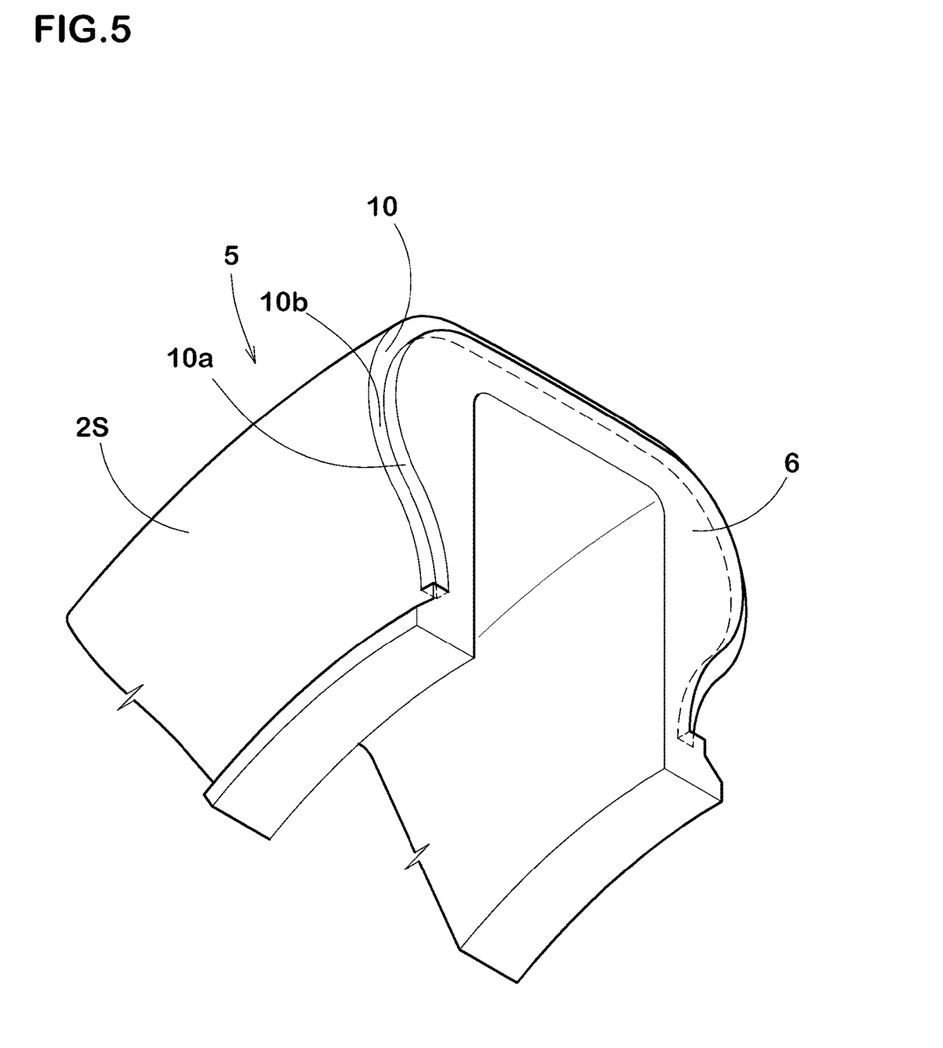
FIG. 5 a partial perspective view of the core segment showing the border recess of the mating face.
Figure 6:
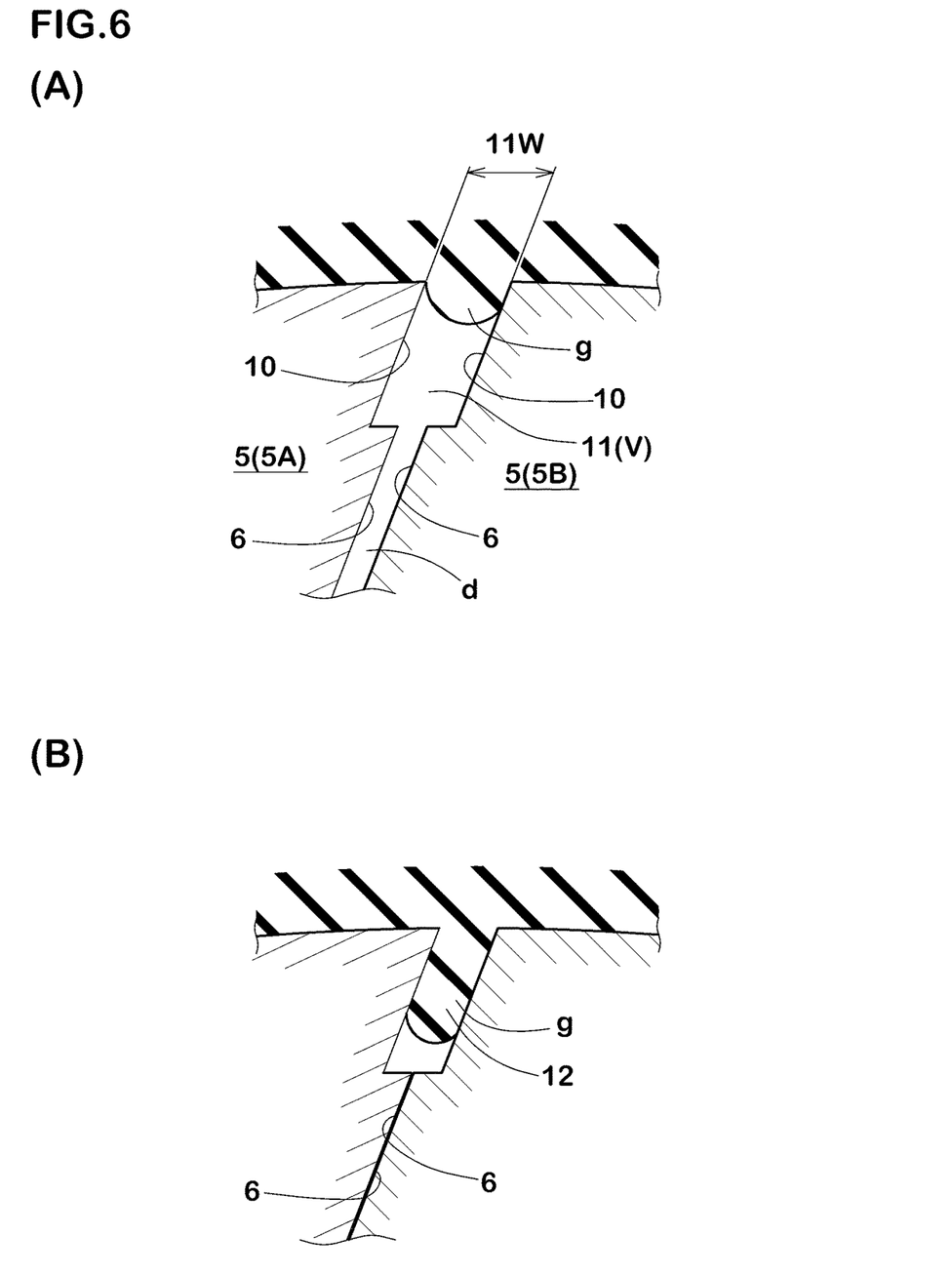

In this example, as shown in FIG. 5, the border recess 10 is formed in a stepped shape comprising a wall surface 10a parallel with the tire molding surface 2s and a bottom surface 10b parallel with the mating face 6. when formed in such stepped shape, in the rubber receiving space 11 formed by the opposite border recesses 10, 10 as shown in FIG. 6, it is possible to ensure a large storage volume v of the rubber (g) for the opening width 11w, and it is possible to enhance the effect of suppressing the occurrence of the after-mentioned mold flash.

when closing the mold or in the initial stage of the vulcanization molding, a phenomenon that rubber is bitten between the adjacent core segments 5, 5 occurs as shown in FIG. 6 (A). However, the rubber (g) bitten at this time is located within the rubber receiving space 11, and does not penetrate into the gap d between the mating faces 6, 6. Therefore, even if the gap (d) between the mating faces 6, 6 is closed as shown in FIG. 6 (B) due to the subsequent thermal expansion of the core main body 2, the bitten rubber (g) stays within the rubber receiving space 11 and is vulcanized as a rib-like protruding portion 12 integrated with the inner surface of the tire. Thus, the bitten rubber (g) can be prevented from being stretched into a thin film and adhering to the mating faces 6, therefore, it is possible to eliminate the operation to remove it.

As described above, the rib-like protruding portions 12 are formed on the tire inner surface, therefore, travelling performance of the tire and the external appearance quality of the tire are not deteriorated.

As shown in FIG. 4, the border width w of the border recess 10 from the outer peripheral edge 6E is 0.5 to 3.0 mm, preferably 1.0 to 3.0 mm. The depth D of the border recess 10 from the mating face 6 is preferably 0.1 to 0.5 mm. If the depth D is less than 0.1 mm, or, the border width w is less than 0.5 mm, then the receiving volume v of the rubber receiving space 11 is reduced, and it becomes difficult to fully exert the effect to suppress the occurrence of membrane-like mold flash. If the depth D exceeds 0.5 mm, the opening width 11w itself is increased and the amount of the bitten rubber g increases. Thus, there is a possibility that the effect to suppress the occurrence of the membrane-like mold flash is rather deteriorated. During vulcanization, the rubber (g) flows into the rubber receiving space 11 due to the internal pressure even after the gap (d) is closed. Therefore, if the border width w exceeds 3.0 mm, the protruding portion 12 becomes high, and increases in the contact area with the border recesses 10. Thus, the adhesion between the rubber (g) and the border recess 10 becomes strong, and a part of the protruding portion 12 is torn off from the tire when removing the core segments 5 from the finished tire. As a result, the torn protruding portion 12 is remained in the tire, and thereby the internal appearance is deteriorated. Therefore, the work to remove the torn protruding portion 12 is needed.

Figure 7:
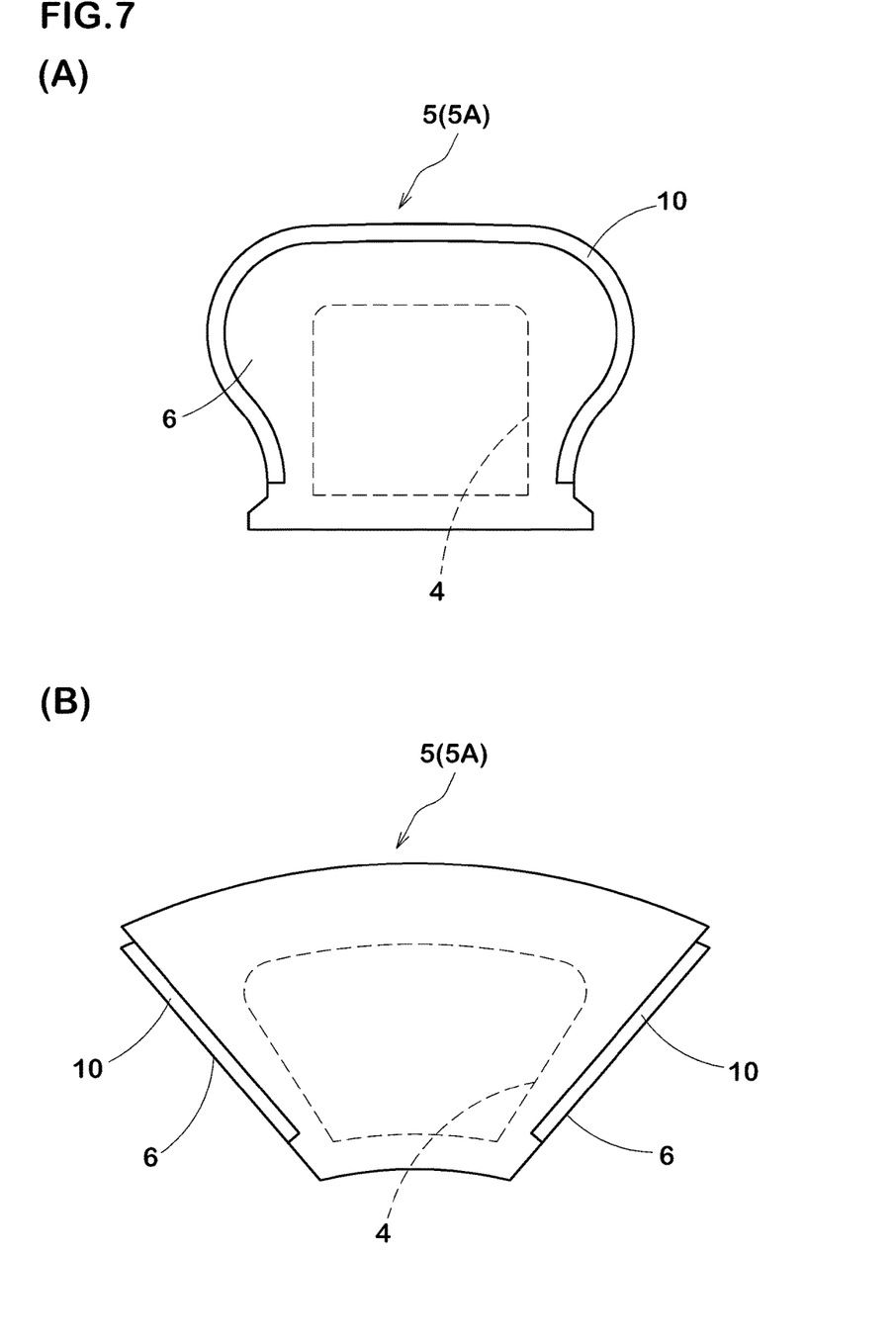

In the core main body 2, the above-mentioned cavity 4 can be formed as being closed within each core segment 5 as shown in FIGS. 7 (A), (B), without extending continuously in the circumferential direction. That is, in each core segment 5, the cavity 4 is not opened in the mating faces 6. In this case, a heated fluid such as steam can be used as the heating means. By flowing the heated fluid into the cavity 4, the inside of the raw tire T is heated through the core main body 2.

while detailed description has been made of an especially preferable embodiment of the present invention, the present invention can be embodied in various forms without being limited to the illustrated embodiment.

Working Examples

In order to confirm the effects of the present inventions, the core main bodies for forming a pneumatic tire of size 195/65R15, were experimentally manufactured based on the specifications shown in Table 1. And, pneumatic tires formed by using the core main bodies were evaluated with respect to the occurrence of membrane-like mold flash and the production efficiency of tires.

They had substantially same specifications except for those listed in Table 1. The core main body was made of aluminum (coefficient of thermal expansion=23.1×10^−6/degree) and divided into ten core segments. The raw tire was formed when the core main body was at normal temperature (20 degrees C.), and the core main body was heated to a high temperature of 150 degrees C. in the vulcanizing mold. The gap (d) between the mating faces in the normal temperature state was 0.2 mm. In each of the border recesses, the wall surface was parallel with the tire molding surface and the bottom surface was parallel with the mating face.

(1) Occurrence of Membrane-Like Mold Flash:

After vulcanization molding, the presence or absence of membrane-like mold flash adhering to the mating faces was visually observed. And it was evaluated by the number of occurrence of the membrane-like mold flash when one hundred tires were vulcanization molded. The smaller number is better.

(2) Tire Production Efficiency:

The sum of the working hours to remove the membrane-like mold flash and the working hours to remove torn protruding portions remaining in the inside of the tire, was evaluated by an index based on Comparative example 1 being 100. The smaller number is better because the working time can be shortened.

TABLE 1

|  | comparative example | working example 1 | working example 2 | working example 3 | working example 4 | working example 5 | working example 6 | working example 7 | working example 8 | working example 9 |
|---|---|---|---|---|---|---|---|---|---|---|
| border recess | none |  |  |  |  |  |  |  |  |  |
| border width W (mm) | — | 0.5 | 1.0 | 2.0 | 3.0 | 3.5 | 2.0 | 2.0 | 2.0 | 2.0 |
| depth D (mm) | — |  |  | 0.3 |  |  | 0.05 | 0.1 | 0.5 | 0.6 |
| Occurrence of membrane-like mold flash | 100 | 95 | 3 | 0 | 0 | 0 | 0 | 0 | 0 | 13 |
| Tire production efficiency | 100 | 95 | 3 | 0 | 0 | 22 | 58 | 0 | 0 | 0 |

As shown in Table 1, it was confirmed that, in the rigid cores as working examples, the membrane-like mold flash did not occur, and the working time to assemble and disassemble the core main body can be shortened.

DESCRIPTION OF THE SIGNS 1 rigid core
2 core main body
2s tire molding surface
5 core segment
6 mating face
6E outer peripheral edge
10 border recess
10a wall surface
10b bottom surface
B vulcanizing mold
Q corner
T raw tire

The invention claimed is:
1. A combination of a vulcanizing mold and a rigid core for vulcanization molding a raw tire for forming a pneumatic tire,
the rigid core comprising: an annular core main body provided in an outer surface thereof with a tire molding surface for forming the raw tire, and being put into the vulcanizing mold together with the raw tire so as to vulcanization mold the raw tire between the vulcanizing mold and the core main body,
the core main body composed of a plurality of core segments which are divided in a circumferential direction,
each of the core segments having both circumferential end surfaces as mating faces, wherein the mating faces adjacent to each other in the circumferential direction are butted to each other so as to form the core main body,
wherein
the core segments are dimensionally configured such that the core main body set in the vulcanizing mold has gaps between the mating faces at a normal temperature of 20° C., whereas the gaps are decreased by thermal expansion as the temperature increases to a higher temperature at which the raw tire is vulcanized, and
each of the mating faces is provided with a border recess which extends along an outer peripheral edge of the mating face abutting on the tire molding surface so that the border recess extends between bead portions of the pneumatic tire, and which dents from the tire molding surface and the mating face so as to prevent the raw tire on the tire molding surface from being pinched between the mating faces when the gaps are decreased.

2. The combination of a vulcanizing mold and a rigid core according to claim 1, wherein each said border recess has a wall surface parallel with the tire molding surface and a bottom surface parallel with the mating face.

3. The combination of a vulcanizing mold and a rigid core according to claim 2, wherein a depth from the mating face to the bottom surface is 0.1 to 0.5 mm, and a depth from the tire molding surface to the wall surface is 0.5 to 3.0 mm.

4. A method for manufacturing a tire comprising a vulcanizing step for vulcanization molding a raw tire using the combination of a vulcanizing mold and a rigid core according to claim 1, whereby ribs protruding from the inner surface of the tire and extending between bead portions of the tire are formed by rubber of the raw tire flowing into the border recesses, wherein the circumferential distance between the mating faces of every other one of the core segments are decreased toward the radially inside, so that the ribs include plural pairs of ribs whose circumferential distance is decreased toward the radially inside.

* * * * *